July 30, 1968 N. W. HURSH 3,395,311

REGULATED POWER SUPPLY

Filed May 23, 1966 2 Sheets-Sheet 1

INVENTOR.
NEAL W. HURSH
BY William H. Meagher
Attorney

July 30, 1968 N. W. HURSH 3,395,311
REGULATED POWER SUPPLY
Filed May 23, 1966 2 Sheets-Sheet 2

INVENTOR.
NEAL W. HURSH
BY
William H. Meagher
Attorney

United States Patent Office 3,395,311
Patented July 30, 1968

3,395,311
REGULATED POWER SUPPLY
Neal W. Hursh, Indianapolis, Ind., assignor to Radio Corporation of America, a corporation of Delaware
Filed May 23, 1966, Ser. No. 552,071
7 Claims. (Cl. 315—22)

This invention relates generally to regulated power supplies, and particularly to novel and improved regulation systems suitable for use in association with the high voltage power supply of a color television receiver.

In color television receivers employing shadow-mask color kinescopes, it is important that the high voltage supplied to the ultor (final accelerating) electrode of the color kinescope remain substantially constant in the face of wide variations in load presented by the color kinescope under varying signal conditions and customer control adjustments. A well-established approach to this regulation problem has involved the use of a so-called shunt regulator in association with the conventional flyback pulse type of high voltage power supply. In this approach, a grid-controlled regulating tube has its space current path disposed effectively in shunt with the kinescope load. As kinescope load variations tend to alter the output of the high voltage rectifier, the alteration is sensed, as, for example, by sampling the B-boost voltage (derived from the same flyback pulse source which provides the input to the high voltage rectifier), and applied to the regulator grid to introduce a compensating variation in the load presented by the regulator tube.

While the shunt regulator arrangement generally described above is capable of quite effective regulation, it requires an expensive high voltage tube as the regulating device, introduces additional X-ray shielding problems and requries a considerable volume of space within the cabinet.

The present invention is directed to a regulating arrangement which provides highly satisfactory performance, while using a relatively inexpensive, low voltage regulating tube, and avoiding the X-ray shielding problems, and with considerable reduction in space requirements. These results are achieved without introducing deflection disturbances (associated with many prior art low voltage regulating schemes). The space saving advantages of use of the present invention are particularly significant in design of a portable television receiver where cabinet space is limited.

In accordance with an embodiment of the present invention, the regulating device is effectively shunted across a segment of the primary winding of the flyback transformer; the device acts as a variable load on the pulse source. The device operation is thus associated with voltages of a much lower level than that provided at the output of the high voltage rectifier. Control of the device may be achieved through sampling of the kinescope beam current itself, preferably through use of a novel transformer winding arrangement, which permits sampling of the beam current with low cost, low voltage-rating elements. To minimize disturbance of raster width, the device is keyed in accordance with a differentiated flyback pulse to restrict its conduction to a period corresponding to the rising edge of the flyback pulse. Preferably, the device is of a multigrid character, with sharp pulsing of both control and screen grids. Inter-electrode capacitance between anode and control grid may be relied upon to effect the control grid pulsing while an external capacitor is employed in effecting the screen grid pulsing.

A primary object of the present invention is to provide a relatively inexpensive, relatively low voltage regulating arrangement for the high voltage supply of a color television receiver, with the regulating arrangement introducing relatively little disturbance of the scanning operations of the receiver.

Other objects and advantages of the present invention will be readily apparent to those skilled in the art upon a reading of the following detailed description, and an inspection of the accompanying drawings in which.

Figure 1:
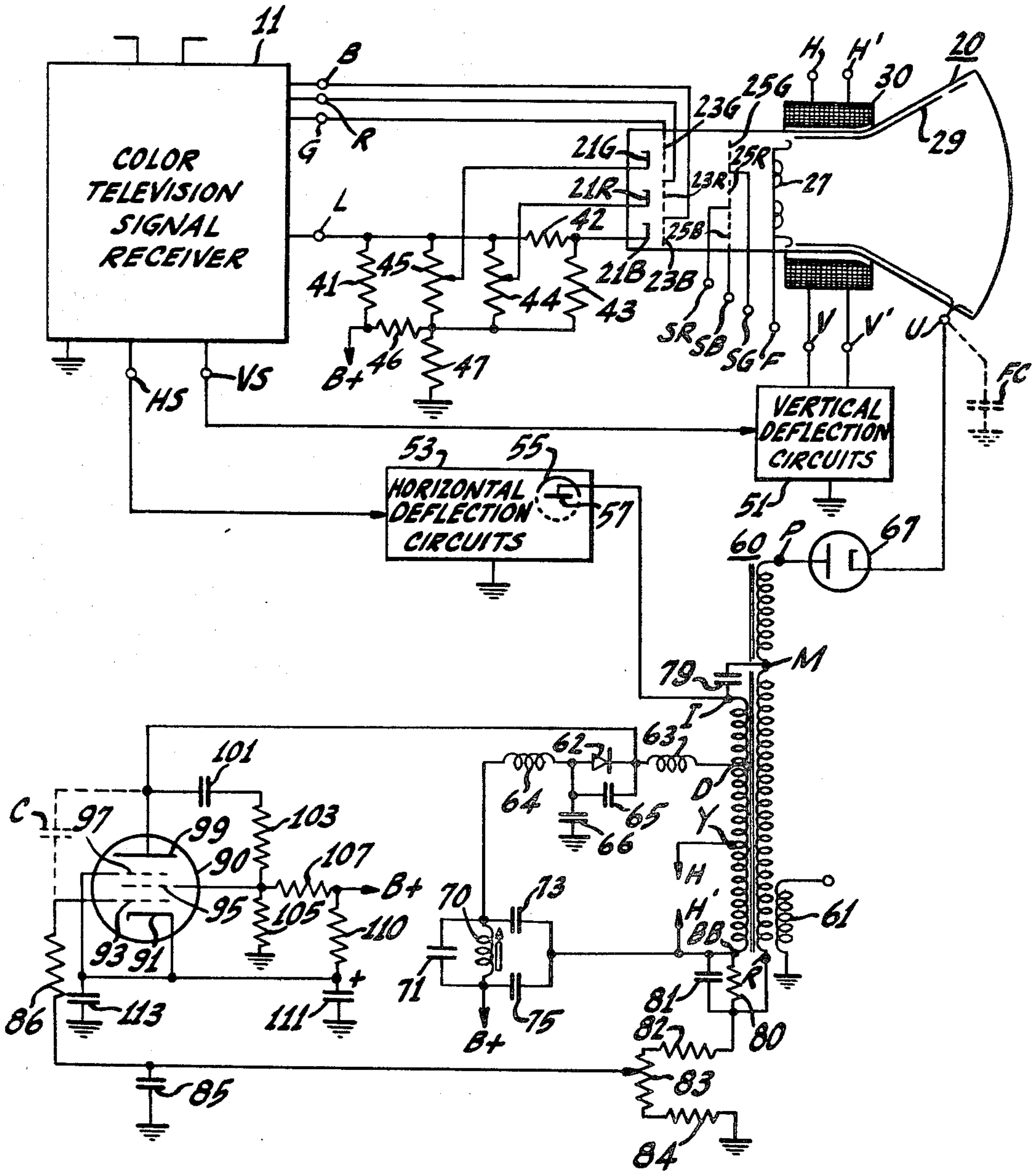
FIGURE 1 illustrates a color television receiver employing a high voltage regulation system in accordance with an embodiment of the present invention, the receiver being shown partially in block form, but with pertinent portions of the deflection and high voltage systems shown schematically.

In the receiver, representation of major components of the receiver has been symbolized by a single block 11 labelled "color television signal receiver." Since the invention is not concerned with such receiver segments as the tuner, IF amplifier, video detector, AGC circuit, luminance and chrominance channels, such a general block designation therefor is deemed appropriate. Shown schematically is the receiver's color image reproducing device, a tri-gun shadow-mask color kinescope 20. Operating electrodes of this device include a trio of cathode electrodes 21G, 21R and 21B, a trio of control grid electrodes 23G, 23R and 23B, a trio of screen grid electrodes 25G, 25R, and 25B, commonly energized focus electrode structure 27 and ultor electrode structure 29. Associated with the kinescope 20 is a deflection yoke 30 for causing the kinescope beams to trace a scanning raster.

Luminance signal information for application to the respective kinescope gun cathodes is developed by receiver apparatus 11 at terminal L; a resistor 41, connected between terminal L and a B+ point in the receiver's low voltage supply (not illustrated), comprises the load resistor for the luminance signal output stage of the apparatus 11. The kinescope cathodes are not directly connected to terminal L, but rather are connected thereto via a resistor arrangement permitting adjustment of the relative amplitudes of luminance drive to the electron guns for color balance purposes. To this end, cathode 21G is connected to the adjustable tap of a potentiometer 45, and, similarly, cathode 21R is connected to the adjustable tap of a potentiometer 44, while cathode 21B is connected to an intermediate point on a fixed voltage divider formed by a pair of resistors 42 and 43. One end terminal of the series combination formed by resistors 42 and 43, as well as one end terminal of each of the potentiometers 44 and 45, are connected directly to terminal L; the opposite end terminals are commonly connected to the junction of a pair of resistors 46 and 47, the latter being connected in series between the B+ supply terminal and chassis ground. The networks above described provide the cathode return for the kinescope beam current.

The respective control grids of the color kinescope 20 receive respectively different color difference signal drives (as well as operating unidirectional potentials) via respective color difference output terminals B, R and G of the receiver apparatus 11. The respective screen grids of the color kinescope 20 are connected to individual supply terminals SR, SB, and SG; operating unidirectional potentials (which may desirably be individually adjustable) may be supplied to these terminals via appropriate power supply structure not illustrated in the drawing. Likewise, the focusing electrode structure 27 of the color kinescope 20 receives an operating potential, which may be adjustable, via terminal F, from power supply structure not illustrated in the drawing.

The deflection yoke 30 associated with kinescope 20 is energized with respective line (horizontal) and field (vertical) frequency scanning waves via respective terminal pairs, H–H′ and V–V′. The vertical deflection circuits 51 supply the field frequency scanning wave input, subject to synchronization in accordance with the vertical synchronizing pulse output appearing at terminal VS of the receiver apparatus 11. The line frequency scanning wave generation is controlled by horizontal deflection circuits 53, subject to synchronization in accordance with the horizontal synchronizing pulse output appearing at terminal HS of receiver apparatus 11. Since the present invention is associated wiith the transformer apparatus employed in applying the line frequency scanning waves to yoke 30, a portion of the horizontal deflection circuitry is illustrated schematically, and attention will now be directed to this circuit arrangement.

The horizontal deflection circuits 53 include an output stage, represented in the drawing by the partially illustrated tube 55, having a plate electrode 57. The plate 57 is directly connected to an input terminal I of the horizontal output transformer 60. Terminal I comprises one end terminal of a first winding (I–BB) of the transformer 60, the I–BB winding providing, as illustrated, a step-down autotransformer coupling between output tube 55 and the horizontal deflection windings of yoke 30. The autotransformer secondary is constituted by the winding segment extending between the other end terminal BB and the intermediate tap Y of the I–BB winding, with yoke terminals H and H′ coupled respectively to tap Y and terminal BB.

In accordance with conventional reaction scanning and power recovery principles, a damper circuit is also associated with the I–BB winding. In the specifically illustrated circuit arrangement, the damper is constituted by a semiconductor diode 62, having its cathode connected via a choke 63 to a tap D (between tap Y and winding end terminal I); the anode of diode 62 is connected via an additional choke 64 in series with an adjustable inductor 70 (the latter serving familiar linearity and/or efficiency adjusting purposes) to the B+ power supply terminal. Opposite ends of the adjustable inductor 70 are coupled by respective B-boost capacitors 73 and 75 to end terminal BB of the transformer winding. An additional capacitor 71, shunting inductor 70, permits flexibility in proportioning the respective capacitors 73 and 75 for optimum deflection circuit efficiency.

The damper diode 62 is shunted by a capacitor 65, and its anode electrode is coupled to chassis ground via a capacitor 66. Elements 63, 64, 65 and 66 are provided to isolate, and minimize the radiation of, high frequency transient components associated with the damper operation.

Trasnformer 60 includes an additional high voltage winding P–M, inductively coupled to the first winding, and serving to develop flyback pulses of stepped-up amplitude for delivery to the anode of the high voltage rectifier 67. The cathode electrode of rectifier 67 is directly connected to the supply terminal U for the ultor electrode structure 29. Filtering of the ultor voltage is inherently achieved by the effective capacitance FC established between the kinescope's inner conductive coating (forming a portion of the ultor electrode structure 29) and the kinescope's grounded outer conductive coating.

In many prior art high voltage arrangements, the end terminal M of the high voltage winding is galvanically connected to the end terminal I of the primary winding, with the primary winding providing a return for the (D.C.) kinescope beam current to the B-boost supply at terminal BB. However, in the illustrated arrangement, this is not done; rather, the capacitor 79 provides capacitive coupling between terminals I and M, isolating the primary winding from the beam current return.

A third transformer winding M–R, in series with a resistor 80, provides the kinescope beam current return path from high voltage winding terminal M to the B-boost terminal BB. Capacitor 81 shunts the resistor 80. The capacitors 79 and 81, of low impedance at the horizontal deflection frequency, insure that the pulse potentials at terminals M and R correspond, respectively, to the pulse potentials at the primary winding terminals I and BB. Accordingly, resistor 80 conveniently serves to sample the kinescope beam current, with substantially no pulse potential thereacross.

A voltage divider, formed by resistor 82, potentiometer 83 and resistor 84 in series, is provided between terminal R and chassis ground. The adjustable tap of potentiometer 83 permits selection of a voltage divided version of the sampled voltage across resistor 80. A capacitor 85 connected between the adjustable tap and chassis ground serves an anti-hunt purpose.

The voltage at the adjustable tap is applied via a resistor 86 to the control grid 93 of a pentode regulator tube 90. The anode-cathode current path of tube 90 is effectively shunted across the D–BB segment of the transformer primary winding, as anode 99 is connected (via choke 63) to tap D, and the cathode 91 is provided with a D.C. return via resistor 110 to the B+ terminal, and an A.C. return to chassis ground via a large, electrolytic capacitor 111.

A unidirectional bias potential is supplied to screen grid 95 of the regulator tube 90 from the B+ terminal via a voltage divider formed by resistors 107 and 105, the latter being connected between screen grid 95 and chassis ground. Suppressor grid 97 is provided with an external direct connection to cathode 91, and a bypass capacitor 113 is coupled between the suppressor pin and chassis ground. A capacitor 101 (in series with a small parasitic suppressing resistor 103) is coupled between the anode 99 and the screen grid 95. The capacitor 101 cooperates with the resistor 105 to develop at screen grid 95 a differentiated version of the flyback pulse appearing at tap D. In similar manner, the interelectrode capacitance C presented between anode 99 and control grid 93 cooperates with the resistor 86 to establish a differentiated version of said flyback pulse at control grid 93. The differentiating circuit parameters are chosen in such manner as to essentially restrict conduction in the regulator tube (by sharp keying) to a brief time interval corresponding to only the rising edge of the flyback pulse.

In operation, the regulator tube 90 serves as a variable load on the flyback pulse source. When a signal or adjustment change causes the kinescope load to increase (tending to reduce the ultor voltage), the resultant increase in beam current in resistor 80 drives the regulator grid 93 in a negative-going direction. This lessens the load presented by regulator tube 90 to the flyback pulse source, thereby introducing a compensating tendency for the ultor voltage to increase. Conversely, when the kinescope load lessens, a positive-going change at grid 93 increases the regulator load in a compensating manner. Restriction of the regulator tube conduction to substantially only the rising edge interval substantially reduces the possibility of regulator action introducing undesired scan modulation. The beam current sampling arrangement permits development of an accurate, large amplitude control voltage for the regulator, using relatively low cost, low voltage sampling elements.

Figure 2A:
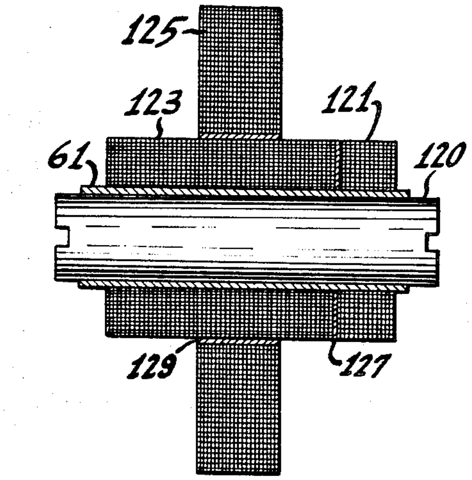
FIGURE 2A illustrates, partially in cross-section, a view of a winding arrangement, suitable for core mounting, of a horizontal output transformer which may be advantageously employed in the circuit arrangement of FIGURE 1.

FIGURE 2A is illustrative of one satisfactory manner in which the windings of the transformer 60 of FIGURE 1 may be physically arranged. The windings are shown in section, mounted on a coil form 120, which may be of the usual hollow, cylindrical form, suitable for mounting on a leg of a rectangular-aperture deflection transformer core. The coil form 120 may be made of a suitable insulating material. Immediately surrounding the coil form 120 is a low voltage, auxiliary winding 61 (also shown in FIGURE 1); this winding may provide a suitable source for the horizontal input to the receiver's convergence circuits (not illustrated in FIGURE 1).

Arranged side-by-side, and encircling the auxiliary winding 61 are a pair of windings 121 and 123 (separated by a thin insulating washer 127). Encircling the central region of winding 123 (and insulated therefrom, as by several layers of insulating tape 129, for example) is an additional winding 125. In use of the transformer structural arrangement of FIGURE 2A for the circuit of FIGURE 1, windings 121, 123 and 125 serve, respectively, as the windings M–R, I–BB and P–M; the side-by-side windings 121 and 123 preferably have a substantially similar number of turns, in view of their circuit functions.

Figure 2B:
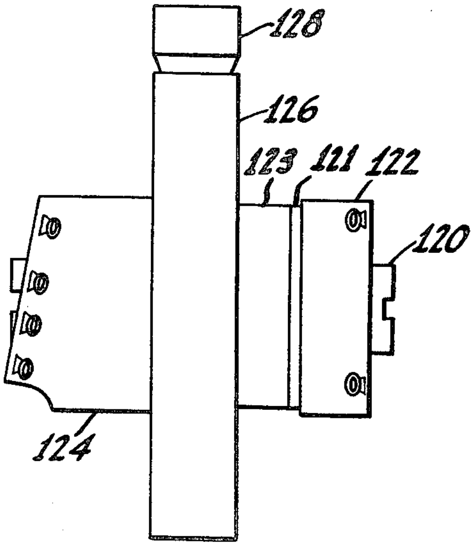
FIGURE 2B illustrates a plan view of the apparatus of FIGURE 2A, in assembly with associated terminal structures and corona shields.

FIGURE 2B illustrates a plan view of the structure of FIGURE 2A in assembly with associated terminal structures and corona shields. Terminal tube 124, of insulating material, surrounds the end of winding 123 remote from winding 121, and provides support for terminal connectors for the transformer primary-secondary circuits. Terminal tube 122, also of non-conducting material, surrounds a segment of winding 121 and provides support for terminal connectors for the beam current return winding circuitry. The high voltage winding 125 is encased in a corona shield 126 of suitable insulating character and an integral high voltage terminal connector may be provided therefor, within a suitable corona shield cap 128.

By way of example, a table or regulator circuit parameter values, suitable for use in the circuit arrangement of FIGURE 1, as set forth below:

| | |
|---|---|
| Capacitor 79 | .01 microfarad. |
| Capacitor 81 | .01 microfared. |
| Capacitor 85 | 1000 micromicrofarads, |
| Capacitor 101 | 15 micromicrofarads. |
| Capacitor 111 | 40 microfarads. |
| Capacitor 113 | 1000 micromicrofarads. |
| Resistor 80 | 270K. |
| Resistor 82 | 560K. |
| Resistor 83 | 500K. |
| Resistor 84 | 390K. |
| Resistor 86 | 10K. |
| Resistor 103 | 100 ohms. |
| Resistor 105 | 33K. |
| Resistor 107 | 68K. |
| Resistor 110 | 680 ohms. |
| Tube 55 | 24JE6A. |
| Tube 67 | 3A3A. |
| Tube 90 | 17KV6. |

What is claimed is:

1. In a television receiver including a kinescope having an ultor electrode, said kinescope, in operation, drawing widely varying amounts of beam current from said ultor electrode, a beam deflection yoke of causing the development of a scanning raster for said kinescope, and a source of horizontal scanning waves, the combination comprising:

means including a first transformer winding for providing step-down autotransformer coupling of said scanning waves between said source and said yoke, said means developing flyback voltage pulses across said winding during recurring retrace intervals of said scanning waves;

means including a second transformer winding, inductively coupled to said first transformer winding, and a rectifier for developing an operating voltage for said ultor electrode;

a regulator tube having cathode, control grid, screen grid and anode electrodes;

means, including a coupling between said anode and a point on said first transformer winding, for effectively shunting the anode-cathode current path of said tube across at least a segment of said first transformer winding;

means for developing a control voltage indicative of variations, if any, of said operating voltage, said control voltage being applied to said control grid;

and means responsive to said flyback pulses for effectively restricting current conduction by said regulator tube to recurrent time intervals each substantially corresponding to the time interval occupied by only the rising edge of a flyback pulse.

2. Apparatus in accordance with claim 1 wherein said conduction restricting means comprises means for developing respective differentiated versions of said flyback voltage pulses at said control grid and screen grid electrodes.

3. Apparatus in accordance with claim 2 wherein said control voltage developing means comprises means for sampling said kinescope beam current.

4. Apparatus in accordance with claim 3 wherein said sampling means includes a resistor, a third transformer winding galvanically connected to said second transformer winding and conveying said beam current to said resistor in such manner that a voltage representative of said beam current may be developed across said resistor without developing thereacross a high potential flyback pulse.

5. In a television receiver including a kinescope having an ultor electrode, said kinescope in operation drawing widely varying amounts of beam current from said ultor electrode, a beam deflection yoke for causing the development of a scanning raster for said kinescope, and a source of horizontal scanning waves, the combination comprising:

means including a first transformer winding for providing step-down autotransformer coupling of said scanning waves between said source and said yoke, said means developing flyback voltage pulses across said winding during recurring retrace intervals of said scanning waves;

means including a second transformer winding, inductively coupled to said first transformer winding, and a rectifier for developing an operating voltage for said ultor electrode from stepped-up versions of said flyback pulses;

a regulator tube having cathode, control grid, screen grid and anode electrodes;

means, including a coupling between said anode and a point on said first transformer winding, for effectively shunting the anode-cathode current path of said tube across at least a segment of said first transformer winding;

means for developing a control voltage indicative of variations, if any, of said operating voltage, said control voltage being applied to said control grid; and means for effectively restricting current conduction by said regulator tube to recurrent time intervals each substantially corresponding to the time interval occupied by only the rising edge of a flyback pulse, said restricting means comprising means coupled to said first transformer winding for differentiating said flyback pulses, and means for applying said differentiated flyback pulses to said screen grid electrode.

6. In a television receiver including a kinescope having an ultor electrode, said kinescope in operation drawing widely varying amounts of beam current from said ultor electrode, a beam deflection yoke for causing the development of a scanning raster for said kinescope, and a source of horizontal scanning waves, the combination comprising:

means including a first transformer winding for providing step-down autotransformer coupling of said scanning waves between said source and said yoke, said means developing flyback voltage pulses across said winding during recurring retrace intervals of said scanning waves;

means including a second transformer winding, inductively coupled to said first transformer winding, and a rectifier for developing an operating voltage for said ultor electrode from stepped-up versions of said flyback pulses;

a regulator tube having cathode, control grid, screen grid and anode electrodes;

means, including a coupling between said anode and a point on said first transformer winding, for effectively shunting the anode-cathode current path of said tube across at least a segment of said first transformer winding;

means responsive to said flyback pulses for effectively restricting current conduction by said regulator tube to recurrent time intervals each substantially corresponding to the time interval occupied by only the rising edge of a flyback pulse;

a third transformer winding inductively coupled to said first transformer winding and wound with a substantially corresponding number of turns;

means for galvanically connecting one end terminal of said third winding to an end terminal of said second winding remote from said rectifier;

means for capacitively coupling said one end terminal of said third winding to the high pulse potential end terminal of said first winding;

a network comprising a resistor shunted by a capacitor coupled between the other end terminals of said first and third windings;

and means responsive to the voltage developed across said network for applying a control voltage to said control grid of said regulator tube.

7. Apparatus in accordance with claim 6 wherein said conduction restricting means includes a second capacitor and a second resistor connected in series between a point on said first winding and a point of reference potential, and means for applying the voltage developed across said second resistor to said screen grid of said regulator tube.

References Cited

UNITED STATES PATENTS

| | | |
|---|---|---|
| 2,726,340 | 12/1955 | Nelson. |
| 2,854,592 | 9/1958 | Ruth. |

RODNEY D. BENNETT, *Primary Examiner.*

T. H. TUBBESING, *Assistant Examiner.*